(12) United States Patent
Wu

(10) Patent No.: US 7,422,202 B2
(45) Date of Patent: Sep. 9, 2008

(54) LENS TRAY POSITIONING APPARATUS

(75) Inventor: Cheng-Shiun Wu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/610,649

(22) Filed: Dec. 14, 2006

(65) Prior Publication Data

US 2008/0029948 A1    Feb. 7, 2008

(51) Int. Cl.
*B23Q 3/00* (2006.01)
(52) U.S. Cl. ............................ 269/303; 269/45; 269/291
(58) Field of Classification Search ................. 269/303, 269/43, 45, 289 R, 302.1, 291, 903
See application file for complete search history.

(56) References Cited

U.S. PATENT DOCUMENTS

| | | | | |
|---|---|---|---|---|
| 2,655,188 | A * | 10/1953 | Catching, Jr. ............... | 269/307 |
| 4,116,426 | A * | 9/1978 | Kessler ......................... | 269/307 |
| 5,386,654 | A * | 2/1995 | Kroenke ....................... | 38/141 |
| 5,516,089 | A * | 5/1996 | Seniff et al. .................. | 269/304 |
| 6,446,951 | B2 * | 9/2002 | Nuxoll et al. ................ | 269/118 |
| 6,708,965 | B2 * | 3/2004 | Nuxoll et al. ................ | 269/118 |
| 2008/0029948 | A1 * | 2/2008 | Wu ............................... | 269/303 |

* cited by examiner

*Primary Examiner*—Lee D Wilson

(57) ABSTRACT

A lens tray positioning apparatus includes a supporting member, at least three non-collinear positioning members and at least one guiding screw member. The supporting member includes a supporting surface and at least one slot defined in the support surface. The at least three non-collinear positioning members are arranged on the supporting surface and include at least one movable positioning member. The at least one movable positioning member is coupled to and threadedly movable relative to the at least one guiding screw member. The at least one guiding screw member is arranged in the at least one slot and is configured for driving the at least one movable positioning member to move. The at least three positioning members are configured for cooperatively retaining a lens tray in position.

10 Claims, 7 Drawing Sheets

LENS TRAY POSITIONING APPARATUS

TECHNICAL FIELD

The present invention relates to lens tray positioning apparatuses and, more particularly, to a lens tray positioning apparatus with different sizes.

BACKGROUND

An automatic assembly line for lens modules may use, for example, a robotic arm to pick up (e.g., by suction, claw or otherwise) lens elements from a lens holder such as a lens tray, and to assemble them into a lens barrel. It is important and often critical to know a precise location and orientation of each lens element, so that the robotic arm can precisely pick up the lens elements from the lens tray. If a lens element shifts and changes its position on the lens tray, and suction is being used, the amount of suction may not be enough to successfully pick up the lens element. Therefore, it's necessary for the lens tray to be precisely positioned and firmly held in place to maintain a position of the lens element. Commonly, the lens tray is disposed and positioned on a positioning apparatus. Usages of the positioning apparatus include: precisely determining a location of the lens tray in order to be identified by the robotic arm; and preventing the lens tray from shaking.

A traditional positioning apparatus includes a supporting member and a plurality of fixed positioning members defined thereon. The lens tray is disposed on the supporting member and the fixed positioning members can press edges of the lens tray to prevent the lens tray from shaking. However, this positioning apparatus can only position lens trays of a predetermined size. If it is desired to use a lens tray of a different size, the positioning apparatus must be changed, thus increasing the assembly cost of lens modules.

What is needed, therefore, is to provide an adjustable lens tray positioning apparatus of different sizes.

SUMMARY

In a preferred embodiment of the present invention, a lens tray positioning apparatus includes a supporting member, at least three non-collinear positioning members and at least one guiding screw member. The supporting member includes a supporting surface and at least one slot defined in the support surface. The at least three non-collinear positioning members are arranged on the supporting surface and include at least one movable positioning member. The at least one guiding screw member is arranged in the at least one slot below the supporting surface of the supporting member. The at least one movable positioning member is coupled to and threadedly movable relative to the at least one guiding screw member. The at least one guiding screw member is configured for driving the at least one movable positioning member to move. The at least three positioning members are configured for cooperatively retaining a lens tray in position.

Advantages and novel features will become more apparent from the following detailed description of the present lens tray positioning apparatus, when taken in conjunction with the accompanying drawings.

BRIEF DESCRIPTION OF THE DRAWINGS

Many aspects of the present lens tray positioning apparatus can be better understood with reference to the following drawings. The components in the drawings are not necessarily drawn to scale, the emphasis instead being placed upon clearly illustrating the principles of the lens tray positioning apparatus. Moreover, in the drawings, like reference numerals designate corresponding parts throughout the several views.

DETAILED DESCRIPTION OF PREFERRED EMBODIMENTS

Reference will now be made to the drawings to describe preferred embodiments of the lens tray positioning apparatus.

Figure 1:
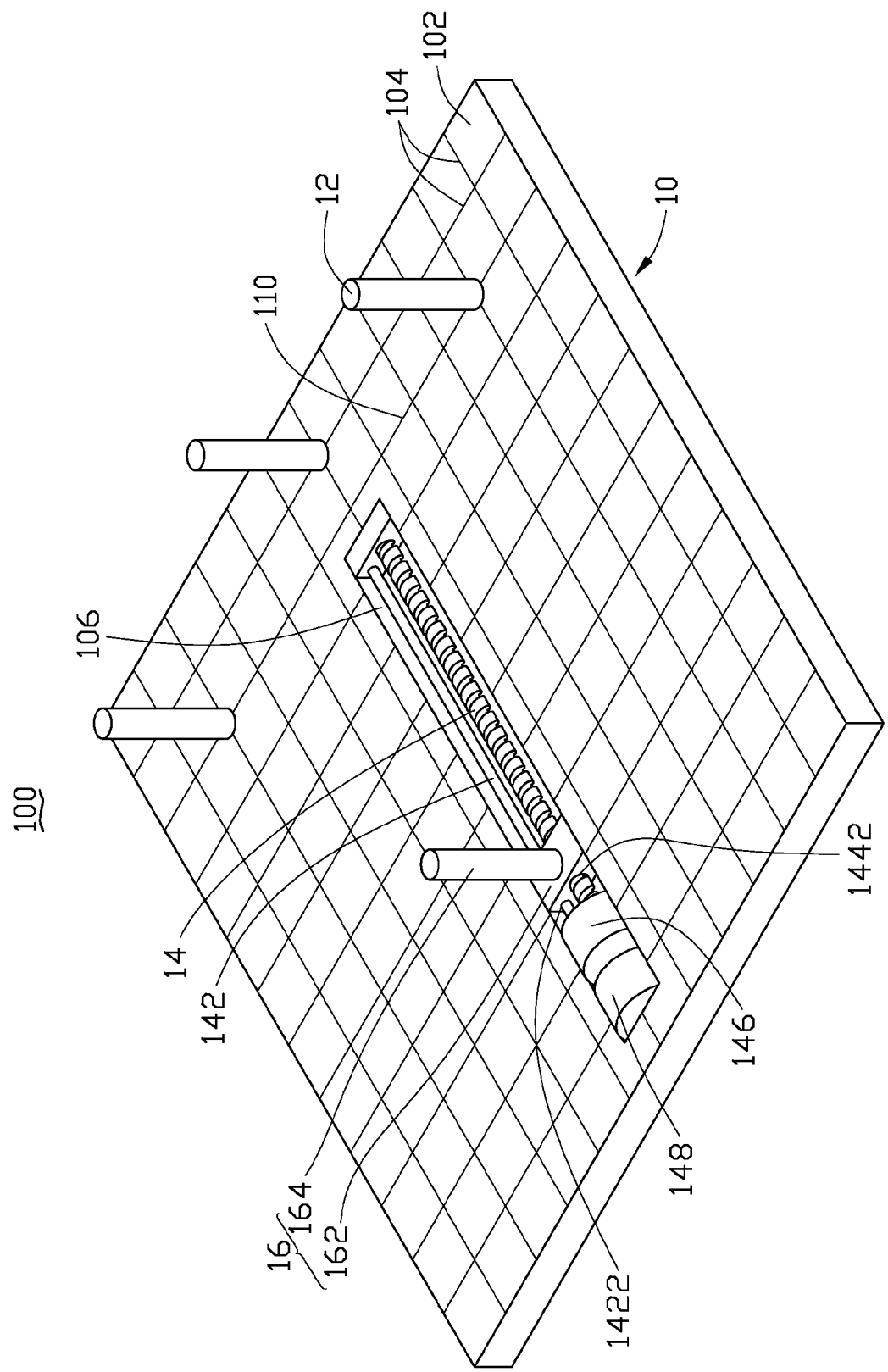
FIG. 1 is a schematic, isometric view of a lens tray positioning apparatus in accordance with a first preferred embodiment.
Figure 2:
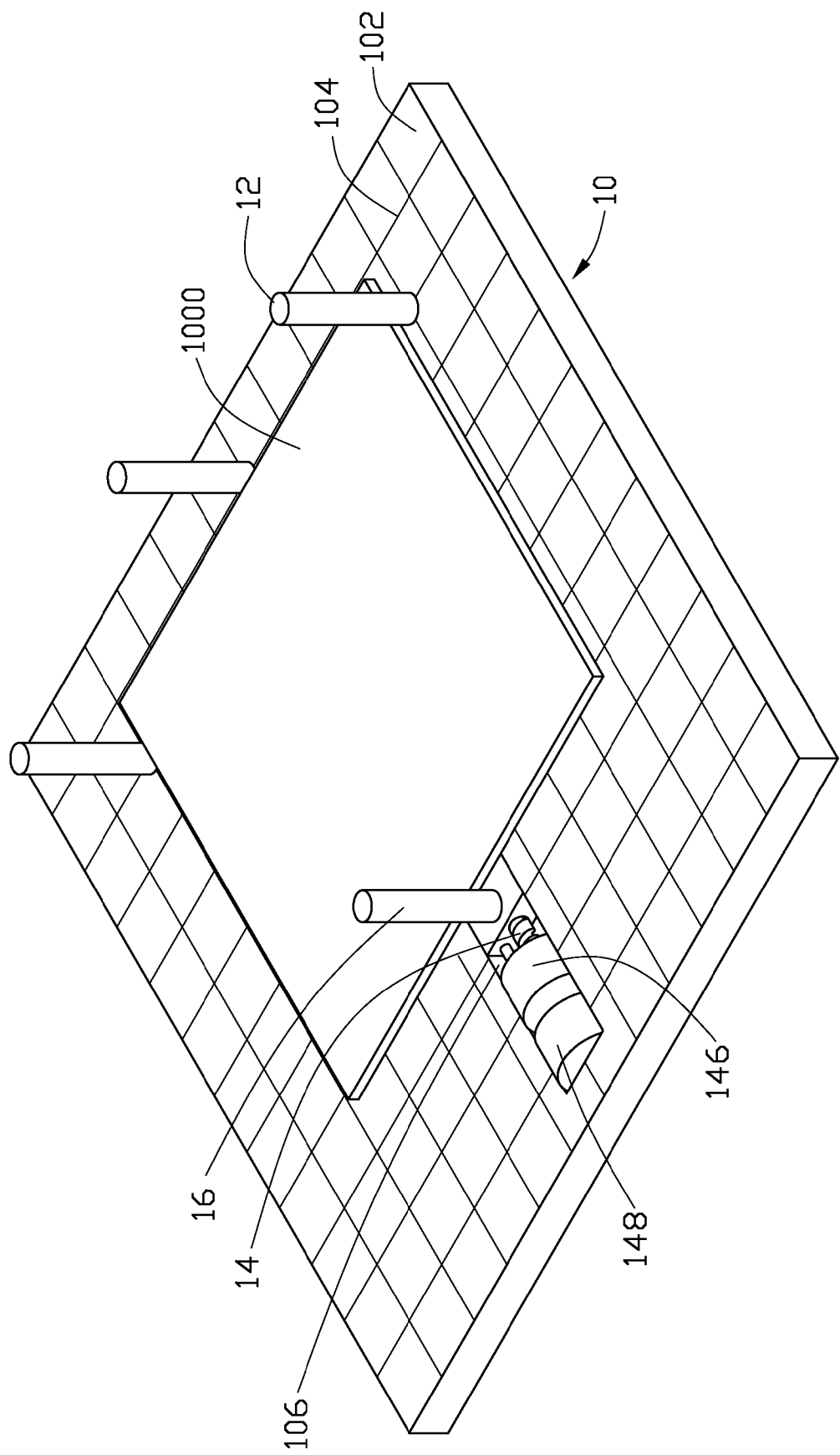
FIG. 2 is similar to FIG. 1, but showing a lens tray being mounted on the lens tray positioning apparatus.

Referring to FIGS. 1 and 2, a lens tray positioning apparatus 100 in accordance with a first preferred embodiment is illustrated. The lens tray positioning apparatus 100 is used for supporting and retaining a lens tray 1000 in position and includes a supporting member 10, a plurality of fixed positioning members 12, a guiding screw member 14, and a movable positioning member 16.

The supporting member 10 has a supporting surface 102, with a plurality of grid lines 104 scored or painted thereon. The grid lines 104 can be used for determining positions of different edges of different size lens trays. Additionally, adjacent to each of the grid lines 104, a size corresponding to a size of a lens tray can be indicated. A slot 106 is defined in the supporting surface 102.

According to this embodiment, three fixed positioning members 12 are attached or integrally formed on the supporting member 10. The three fixed positioning members 12 are arranged at three vertexes of a triangle. Preferably, the triangle is an isosceles triangle. A material of the fixed positioning member 12 can be selected from a group consisting of plastic, steel, or other materials with high rigidity in order to maintain a precise position. In this embodiment, the fixed positioning member 12 includes a post portion.

The guiding screw member 14 is arranged in the slot 106 below the supporting surface 102. The movable positioning member 16 includes an engaging portion 162 and a post portion 164. The engaging portion 162 is configured for in threaded engagement with the guiding screw member 14. The post portion 164 fixed on the engaging portion 162. The lens tray positioning apparatus 100 further includes a guiding shaft 142 arranged in the slot 106 and the guiding shaft 142 is parallel with the guiding screw member 14. The engaging portion 162 defines a through hole 1422 therein and the guiding shaft 142 is configured for extending through the through hole 1422. A material and shape of the movable positioning member 16 can be same as the fixed positioning member 12. When rotating the guiding screw member 14, the engaging portion 106 will be driven to threadedly move relative to the guiding screw member 14. Thus the movable positioning member 16 can be positioned anywhere along the slot 106. The positioning apparatus 100 further includes a motor 146 a controller 148 motor 146. The motor 146 is configured for driving the screw rod 1422 to rotate and the controller 148 is configured for controlling the motor 146. The motor 146 can be selected from a group consisting of a synchronous motor, an induction motor, a reluctance motor and so on.

Referring to FIG. 2, the lens tray 1000 is positioned on the supporting member 10. In this embodiment, the lens tray 1000 is rectangle-shaped. Three edges of the lens tray 1000 are blocked by the three fixed positioning members 12 and another edge of that is blocked by the movable positioning member 16. When a lens tray with a smaller size or a larger size is positioned on the supporting member 10, the movable positioning member 16 should be driven by the motor 146 towards the fixed positioning member 12 or apart from the fixed positioning member 12.

It is to be understood that each edge of the lens tray 1000 can be blocked by two or more fixed positioning members 12 or movable positioning members 16 to more firmly retain the lens tray 1000 in position.

Figure 3:
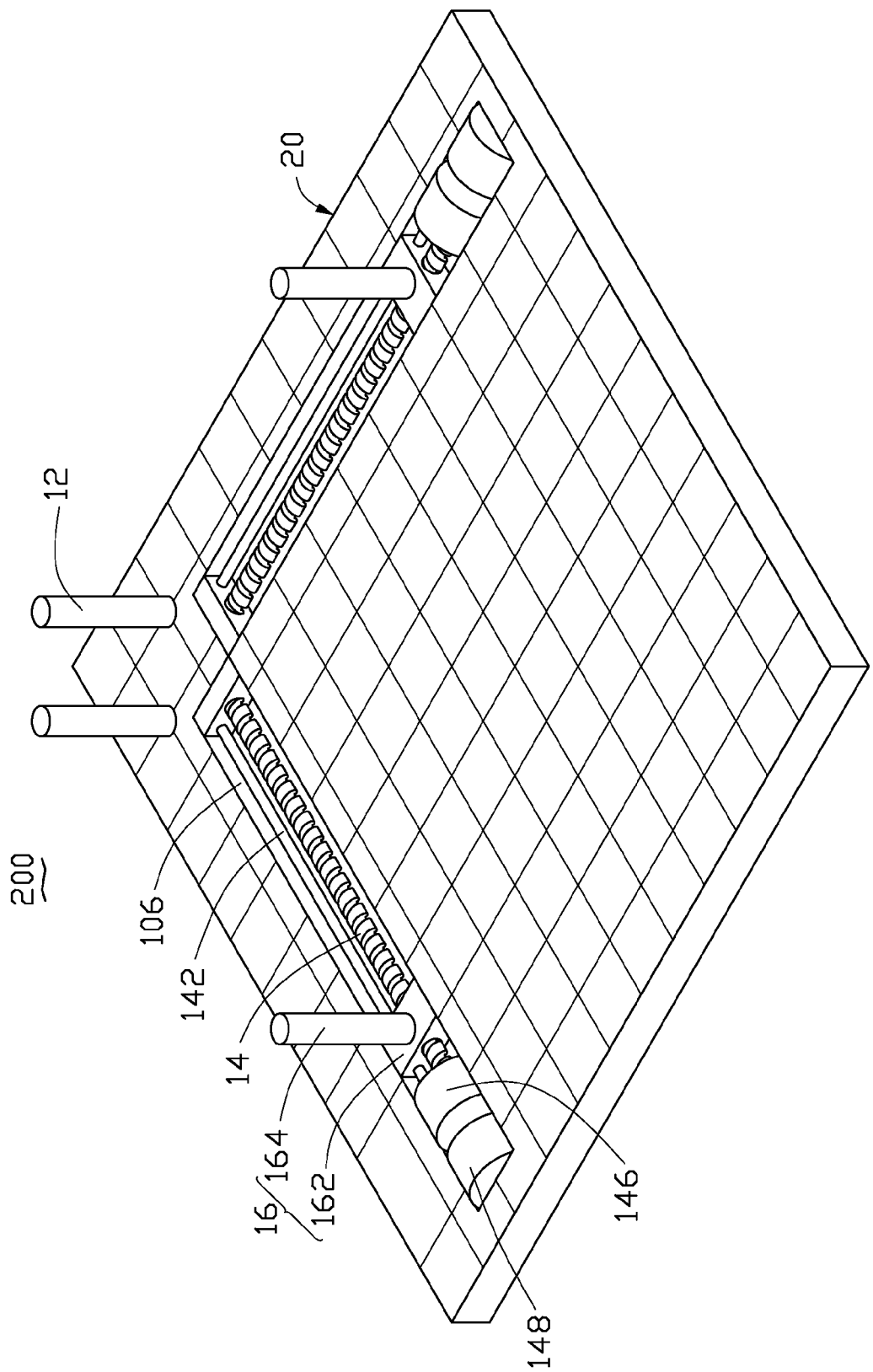
FIG. 3 is a schematic, isometric view of a lens tray positioning apparatus in accordance with a second preferred embodiment.
Figure 4:
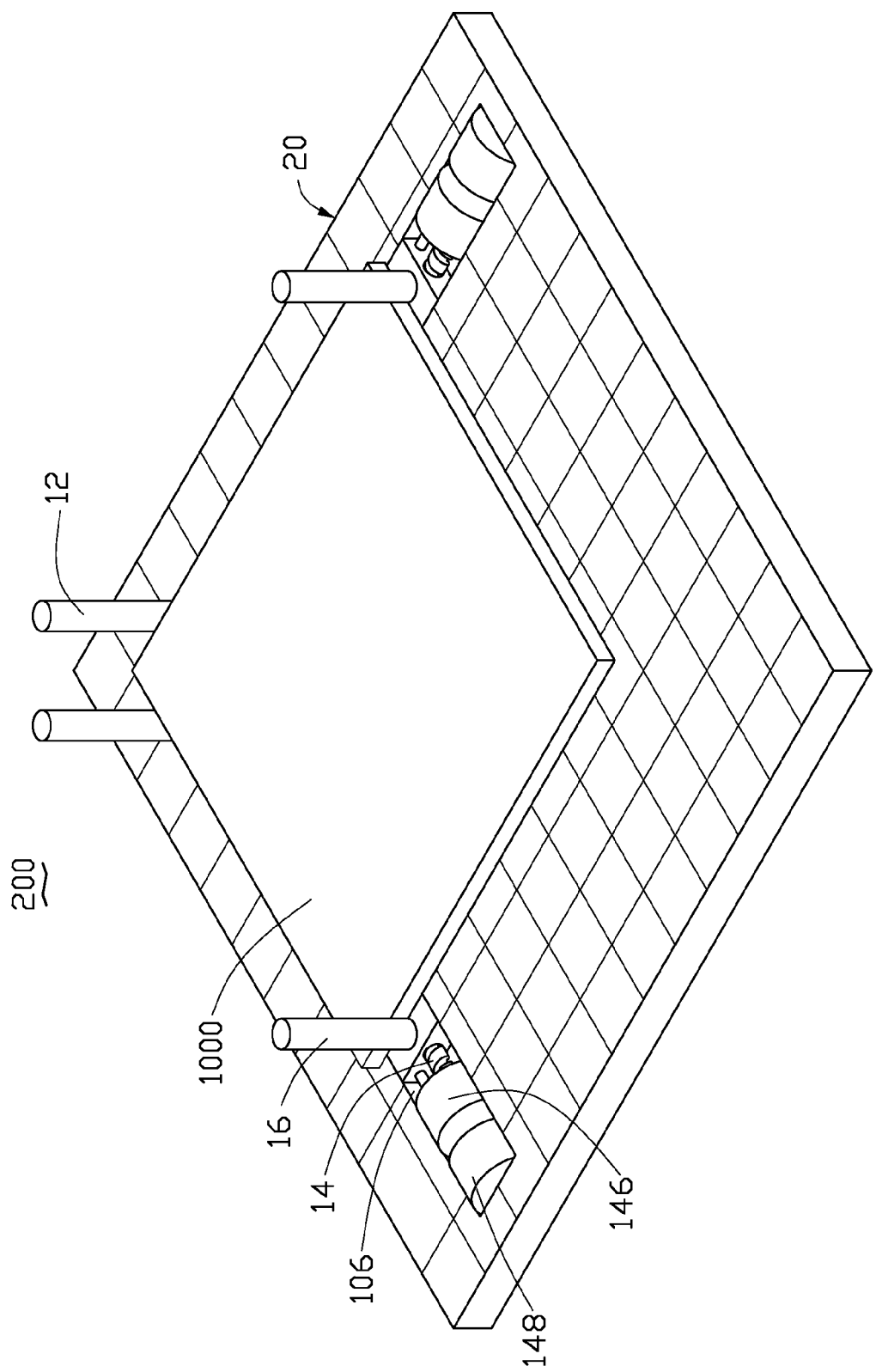
FIG. 4 is similar to FIG. 3, but showing a lens tray being mounted on the lens tray positioning apparatus.

Referring to FIGS. 3 and 4, a lens tray positioning apparatus 200 is illustrated in accordance with a second embodiment. The lens tray positioning apparatus 200 includes a supporting member 20, two fixed positioning members 12, two guiding screw members 14 and two movable positioning members 16. Corresponding to the two movable positioning members 16, the lens tray positioning apparatus 200 further includes two motors 146 and two controllers 148.

The supporting member 20 is essentially similar to the supporting member 10 and the difference is that the supporting member 20 defines two slots 106 for receiving the two guiding screw member 14. The two movable positioning members 16 are driven by the corresponding guiding screw member 14 to move along the corresponding slot 106. The fixed positioning members 12 are configured for blocking two edges of the lens tray 1000 and the movable positioning members 16 are configured for blocking the other two edges of that. In this embodiment, one of the two guiding screw members 14 is perpendicular to the other, and the two fixed positioning members 12 are positioned separately at extension lines of the two guiding screw members 14. Certainly, other locations for the fixed positioning members 12 and the movable positioning members 16 disposed on the supporting member 20 can be selected, as long as the four edges of the lens tray 1000 can be blocked. In this embodiment, the positioning apparatus 200 can be applied to a group of rectangular lens trays with different lengths and different widths.

Figure 5:
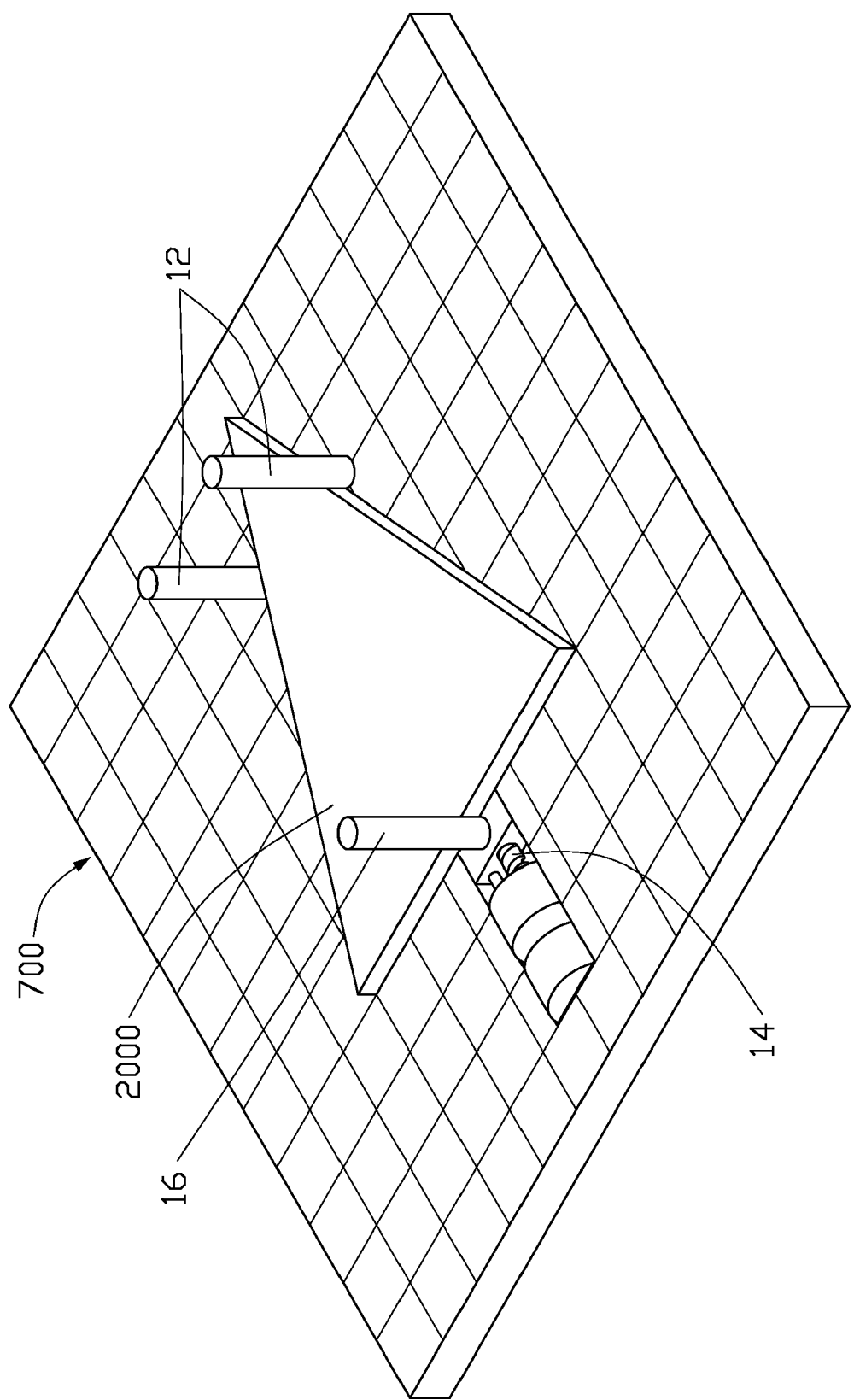
FIGS. 5 to 7 are schematic, isometric views of another three lens tray positioning apparatuses with three lens trays respectively mounted thereon in accordance with another three preferred embodiments, wherein the three lens trays have different shapes.

In addition to a quadrangle shape, the lens tray positioning apparatus of this invention can be applied to lens trays with other shapes. Referring to FIG. 5, a triangular lens tray 2000 is mounted on a lens tray positioning apparatus 700. The lens tray positioning apparatus 700 includes two fixed positioning members 12, a guiding screw member 14, and a movable positioning member 16 corresponding to the guiding screw member 14. The two fixed positioning members 12 are configured for blocking two edges of the lens tray 2000, and the movable positioning member 16 is configured for blocking the remaining edge.

Figure 6:
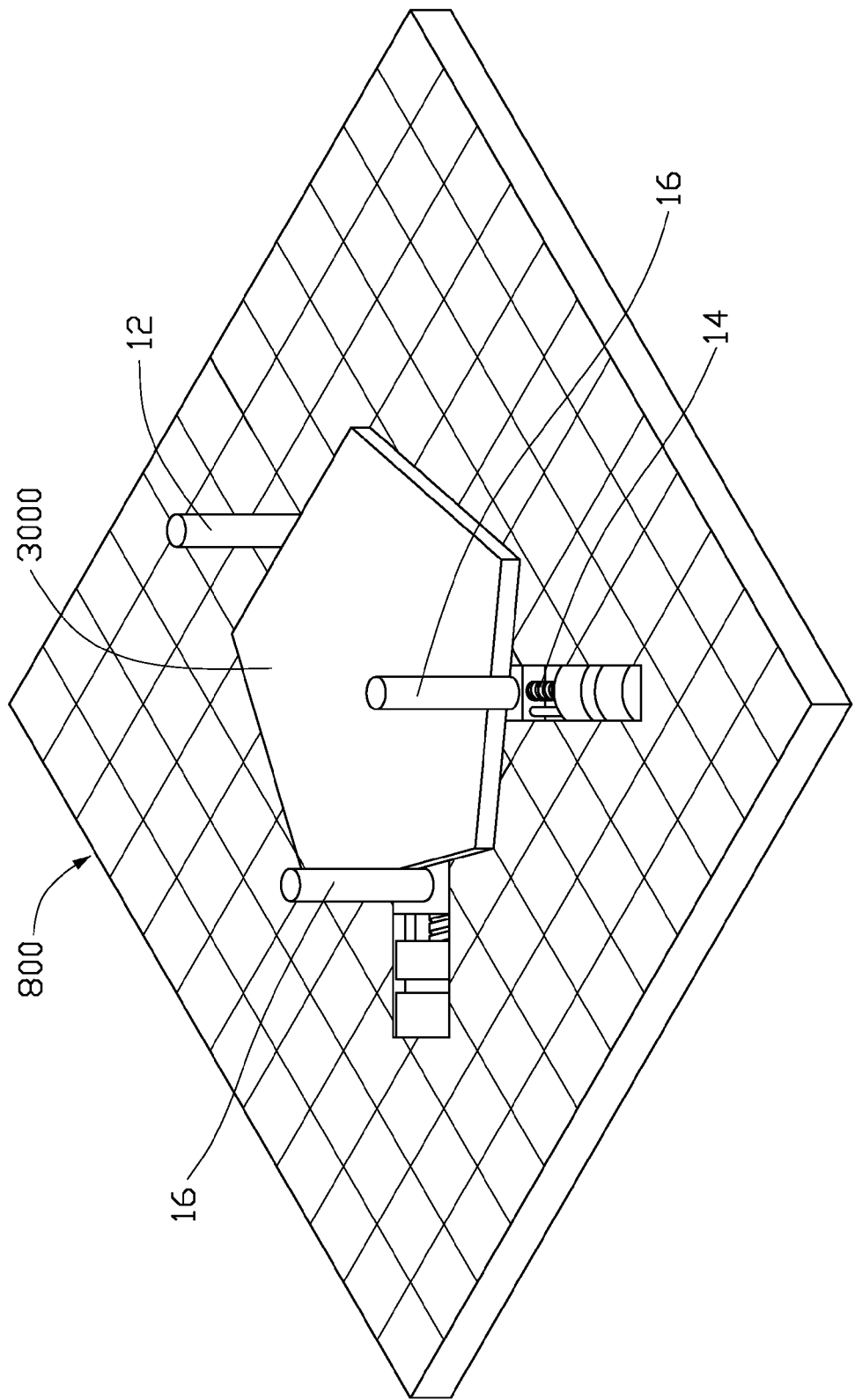

Referring to FIG. 6, a pentagonal lens tray 3000 is mounted on a lens tray positioning apparatus 800. The lens tray positioning apparatus 800 includes an fixed positioning member 12, two guiding screw members 14 and two movable positioning members 16 corresponding to the two guiding screw members 14. The fixed positioning member 12 is configured for blocking an edge of the lens tray 3000, and the two movable positioning members 16 are configured for blocking another two edges not adjacent to that.

Figure 7:
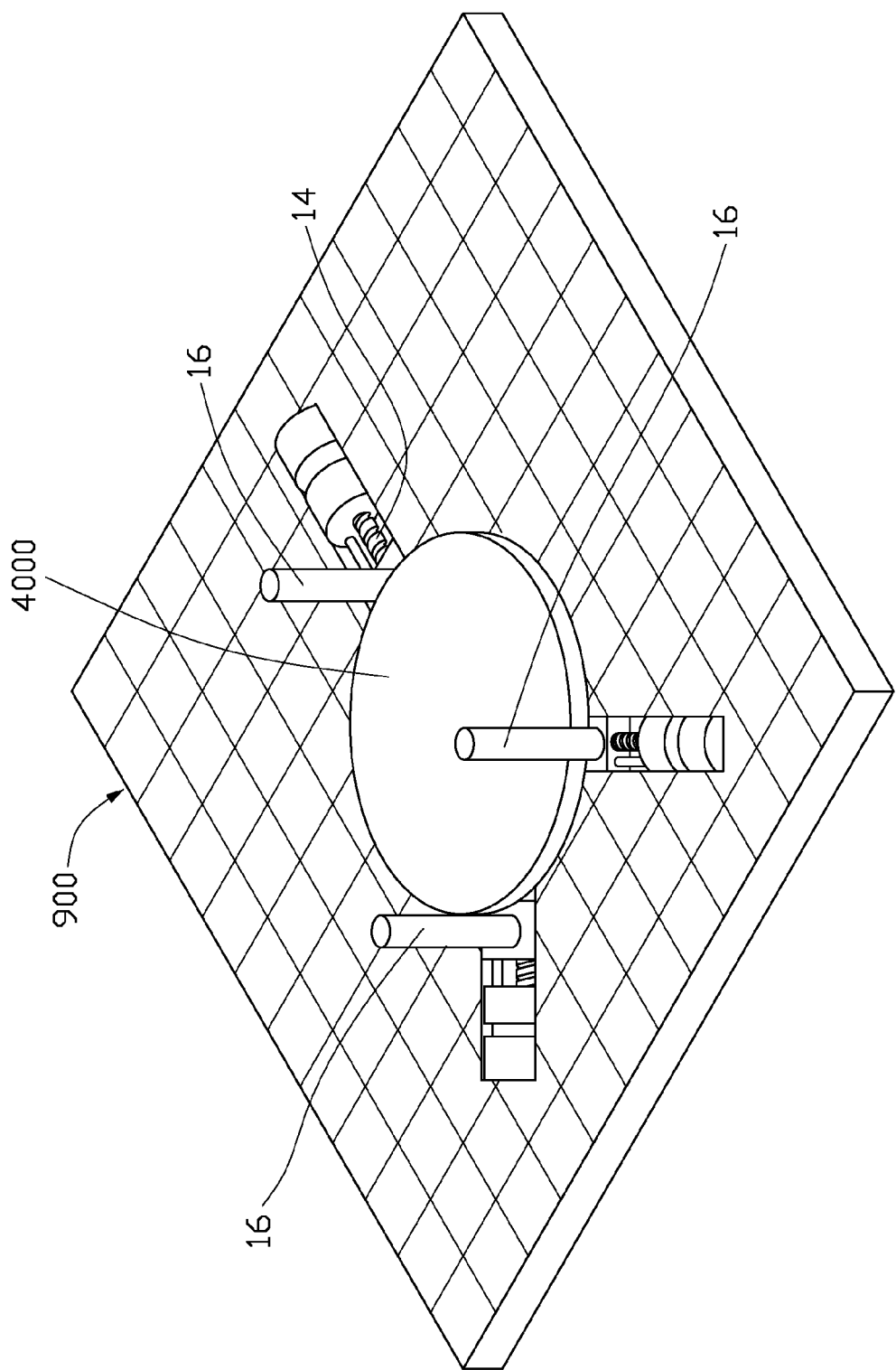

Referring to FIG. 7, a circular lens tray 4000 is mounted on a lens tray positioning apparatus 900. The lens tray positioning apparatus 900 includes three guiding screw members 14 and three movable positioning members 16 corresponding to the three guiding screw members 14. The three movable positioning members 16 are configured for cooperatively positioning the circular lens tray 4000 on the lens tray positioning apparatus 900.

From the above embodiments we can see that the positioning apparatuses according to this invention can be applied to lens trays of all sorts of shapes and sizes. The amount and arrangement of the fixed positioning member 12 and the movable positioning member 16 can be selected according to the shape of the lens tray. In addition, the fixed positioning member 12 and the post portion 164 of the movable positioning member 16 can be other shapes, for example, cuboid.

It is to be understood that the guiding screw member 1422 can be replaced by other mechanisms, for example, a piston, as long as the mechanism can urge the movable positioning member 16 to move along the slot 106.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A lens tray positioning apparatus, comprising:
   a supporting member comprising a supporting surface and at least one slot defined in the support surface;
   at least three non-collinear positioning members arranged on the supporting surface, the at least three positioning member including at least one movable positioning member;
   at least one guiding screw member arranged in the at least one slot below the supporting surface of the supporting member, the at least one guiding screw member extending along the at least one slot, the at least one movable positioning member being coupled to and threadedly movable relative to the at least one guiding screw member, the at least one guiding screw member being configured for driving the at least one movable positioning member to move along the at least one slot, the at least three positioning members being configured for cooperatively retaining a lens tray in position.

2. The positioning apparatus as claimed in claim 1, wherein the at least three positioning members comprises a fixed positioning member fixedly arranged on the supporting surface.

3. The positioning apparatus as claimed in claim 1, wherein the at least one movable positioning member comprises an engaging portion in threaded engagement with the at least one guiding screw member.

4. The positioning apparatus as claimed in claim 3, wherein at least one guiding shaft is arranged in the at least one slot, the at least one guiding shaft being parallel with the at least one guiding screw member, the engaging portion of the at least one movable positioning member defining a through hole for extension of the guiding shaft therethrough.

5. The positioning apparatus as claimed in claim 1, further comprising a motor for driving the guiding screw member to rotate.

6. The positioning apparatus as claimed in claim 5, further comprising a controller for controlling the motor.

7. The positioning apparatus as claimed in claim 1, wherein a plurality of grid lines is marked on the supporting surface.

8. The positioning apparatus as claimed in claim 1, wherein the at least one movable positioning member includes a post portion.

9. The positioning apparatus as claimed in claim 1, wherein a material of the at least one movable positioning member is selected from a group consisting of plastic and steel.

10. A lens tray positioning apparatus, comprising:
- a supporting member comprising a supporting surface and at least one slot defined in the support surface;
- at least three non-collinear positioning members arranged on the supporting surface, the at least three positioning members including at least one movable positioning member;
- at least one guiding screw member arranged in the at least one slot below the supporting surface of the supporting member, the at least one movable positioning member being coupled to and threadedly movable relative to the at least one guiding screw member, the at least one guiding screw member being configured for driving the at least one movable positioning member to move the at least three positioning members, the at least three positioning members being configured for cooperatively retaining a lens tray in position;
- a motor for driving the guiding screw member to rotate.

* * * * *